United States Patent
Hori (10) Patent No.: US 9,349,079 B2
(45) Date of Patent: May 24, 2016

(54) INFORMATION PROCESSING APPARATUS WHICH SPECIFIES A SET OF ONE OR MORE CANDIDATE SIZES OF A RECORDING MEDIUM TO BE USED FOR PRINTING BY A PRINTER, METHOD THEREFOR, AND COMPUTER-READABLE STORAGE MEDIUM

(71) Applicant: CANON KABUSHIKI KAISHA, Tokyo (JP)

(72) Inventor: Daisuke Hori, Kawasaki (JP)

(73) Assignee: CANON KABUSHIKI KAISHA, Tokyo (JO)

( * ) Notice: Subject to any disclaimer, the term of this patent is extended or adjusted under 35 U.S.C. 154(b) by 0 days.

(21) Appl. No.: 14/329,840

(22) Filed: Jul. 11, 2014

(65) Prior Publication Data

US 2015/0029545 A1 Jan. 29, 2015

(30) Foreign Application Priority Data

Jul. 25, 2013 (JP) ................................. 2013-154957

(51) Int. Cl.
*G06K 15/00* (2006.01)
*G06K 15/02* (2006.01)

(52) U.S. Cl.
CPC .................................. *G06K 15/1823* (2013.01)

(58) Field of Classification Search
USPC ......................................................... 358/1.15
See application file for complete search history.

(56) References Cited

U.S. PATENT DOCUMENTS

2002/0054343 A1* 5/2002 Nagata .......................... 358/1.15
2005/0206947 A1* 9/2005 Kitahara et al. ............. 358/1.15

FOREIGN PATENT DOCUMENTS

| JP | 2004-240585 | * | 8/2004 | ................ G06F 3/12 |
| JP | 2004-240585 A | | 8/2004 | |

OTHER PUBLICATIONS

Machine translation for JP 2004-240585, Aug. 26, 2004.*

* cited by examiner

*Primary Examiner* — Qian Yang
(74) *Attorney, Agent, or Firm* — Fitzpatrick, Cella, Harper & Scinto (57) ABSTRACT

An application is determined, which has a function of printing data using a printer and requests capability information of the printer. Based on the determined application and the capability information of the printer, sizes of selection candidates of a recording medium to be used for printing are decided. The decided sizes are provided to the application.

21 Claims, 7 Drawing Sheets

INFORMATION PROCESSING APPARATUS WHICH SPECIFIES A SET OF ONE OR MORE CANDIDATE SIZES OF A RECORDING MEDIUM TO BE USED FOR PRINTING BY A PRINTER, METHOD THEREFOR, AND COMPUTER-READABLE STORAGE MEDIUM

BACKGROUND OF THE INVENTION

1. Field of the Invention

The present invention relates to an information processing apparatus and, more particularly, to an information processing apparatus for controlling output setting of an output control apparatus including a plurality of output control programs (applications), a method for the information processing apparatus, and a program.

2. Description of the Related Art

To execute printing from an application, printing is conventionally performed by displaying a dedicated printer driver UI displayed by a printer driver. Alternatively, an application asks a printer driver about the capability of an arbitrary printing attribute, generates a dedicated GUI for print settings, and displays the capability, thereby making print settings. Especially, making print settings in an application without opening a printer driver UI is effective at improving the user operability.

As a technique of making print settings without opening a printer driver UI, an output control apparatus disclosed by Japanese Patent Laid-Open No. 2004-240585 prevents the user from selecting an unnecessary paper size by making the user set in advance paper sizes to be displayed by an application.

In the above-described technique disclosed by Japanese Patent Laid-Open No. 2004-240585, however, the capability of a printer driver is equally returned to all applications. Some applications cannot control the capability of the driver, resulting in a print setting error or printing error. For example, assume that paper sizes processible by the printer driver include an A4 size and borderless A4 size. In this case, in some applications, the paper size of paper sheets to be used to print data of the A4 size may be set to the borderless A4 size by default. Even if, therefore, the A4 size (bordered) should be selected, data may be erroneously printed at the borderless A4 size. The cause of this problem is that the A4 size and the borderless A4 size have the same outer size, and thus the application side erroneously selects a paper size.

SUMMARY OF THE INVENTION

The present invention provides an information processing technique capable of providing, to an application, a list of the sizes of recording media corresponding to the application.

To achieve the above object, an information processing apparatus according to the present invention has the following arrangement. That is, an information processing apparatus comprising: a determination unit configured to determine an application which has a function of printing data using a printer and requests capability information of the printer; a decision unit configured to decide, based on the application determined by the determination unit and the capability information of the printer, sizes of selection candidates of a recording medium to be used for printing; and a provision unit configured to provide the sizes decided by the decision unit to the application.

According to the present invention, it is possible to provide, to an application, a list of the sizes of printing media corresponding to the application.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings.

Figure 1:
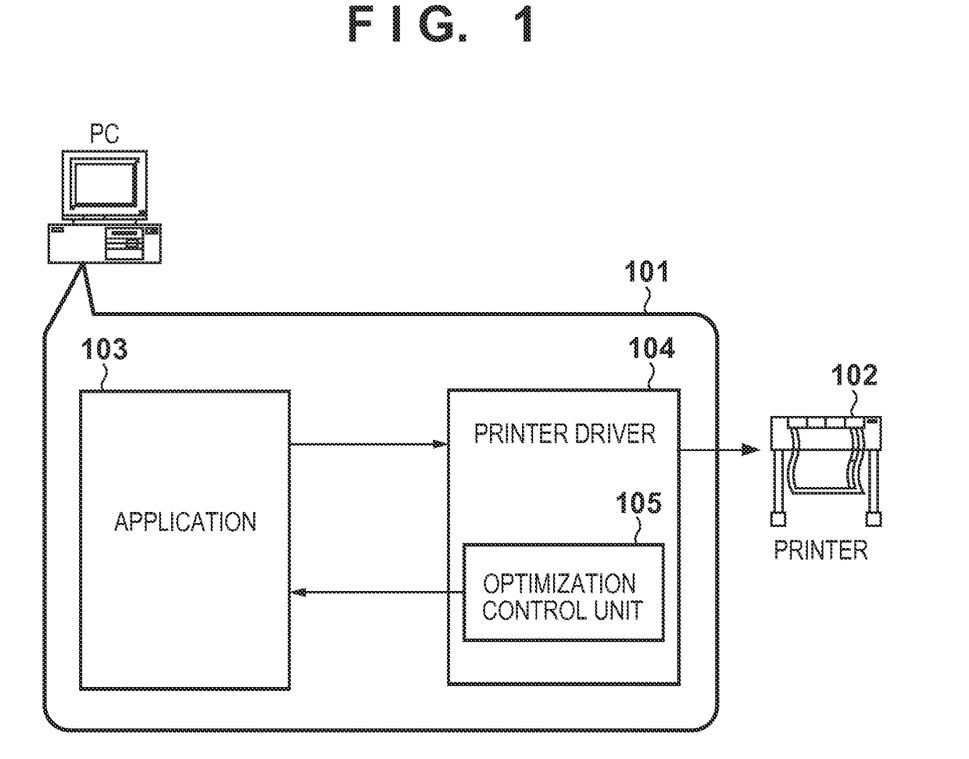
FIG. 1 is a block diagram showing the arrangement of an output control apparatus.

FIG. 1 is a block diagram showing the system arrangement of an output control apparatus having a paper size optimization processing function according to the embodiment of the present invention. This system includes a PC (Personal Computer) 101 serving as an information processing apparatus, and a printer 102 as an output apparatus represented by a large format printer.

Reference numeral 103 denotes an application which operates on the PC 101 and has a function of printing arbitrary data. The application 103 includes one or a plurality of applications.

Reference numeral 104 denotes a printer driver to which the application 103 requests printing via an operating system (to be referred to as an OS hereinafter). The printer driver 104 performs processing of interpreting a print instruction received via the OS, and generating print data interpretable by the printer.

Reference numeral 105 denotes an optimization control unit which performs an operation of switching the types of paper sizes processible by the printer driver 104 and the order of the list of the paper sizes for each application 103, and returning the capability information of the printer driver 104 to the application 103. The optimization control unit 105 operates as part of the function of the printer driver 104. Note that the optimization control unit 105 can also operate as a separate module to control capability information between the printer driver 104 and the application 103, independently of the printer driver 104.

Figure 2:
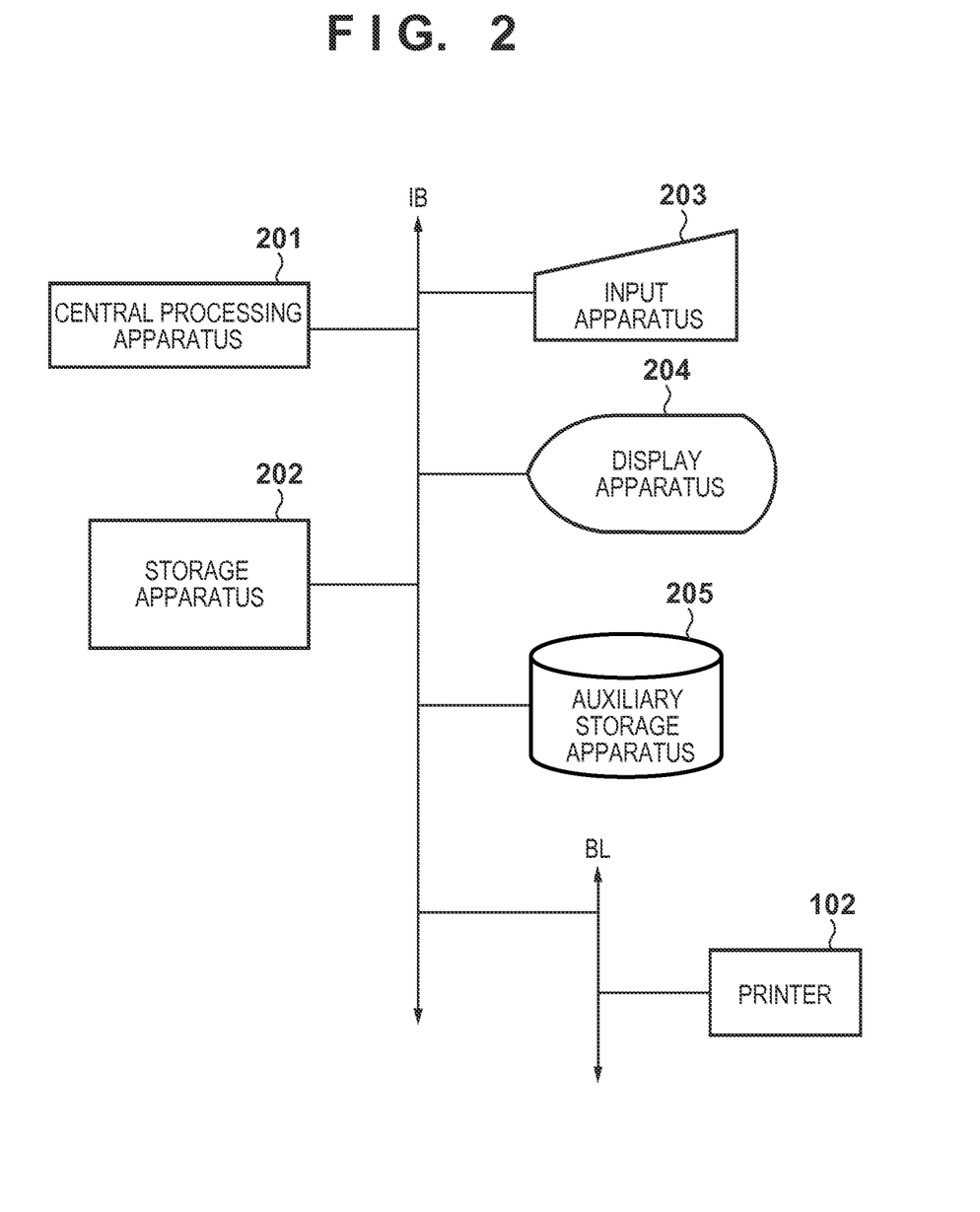
FIG. 2 is a block diagram showing connection between the outside and the internal structure of a PC.

FIG. 2 is a block diagram showing connection between the outside and the internal structure of the PC 101.

The PC 101 has a general arrangement like a general-purpose computer. More specifically, the PC 101 includes a central processing apparatus 201 including a CPU, a storage apparatus 202 such as a RAM, an input apparatus 203 such as a mouse or keyboard, a display apparatus 204 such as a CRT or LCD, and an auxiliary storage apparatus 205 such as a hard disk or magnetooptical disk. The respective components of the PC 101 are interconnected via an internal bus line IB.

The input apparatus 203 is used to perform various input operations based on user instructions for icons, a menu, and other objects displayed on the display apparatus 204 by the application 103.

The auxiliary storage apparatus 205 stores the printer driver 104, the OS, and other program information, which are called by the central processing apparatus 201, as needed, and stored in the storage apparatus 202. The internal bus line IB of the PC 101 is connected to the printer 102 via an external bus line BL, thereby enabling the PC 101 to register a print job in the printer 102.

Figure 3:
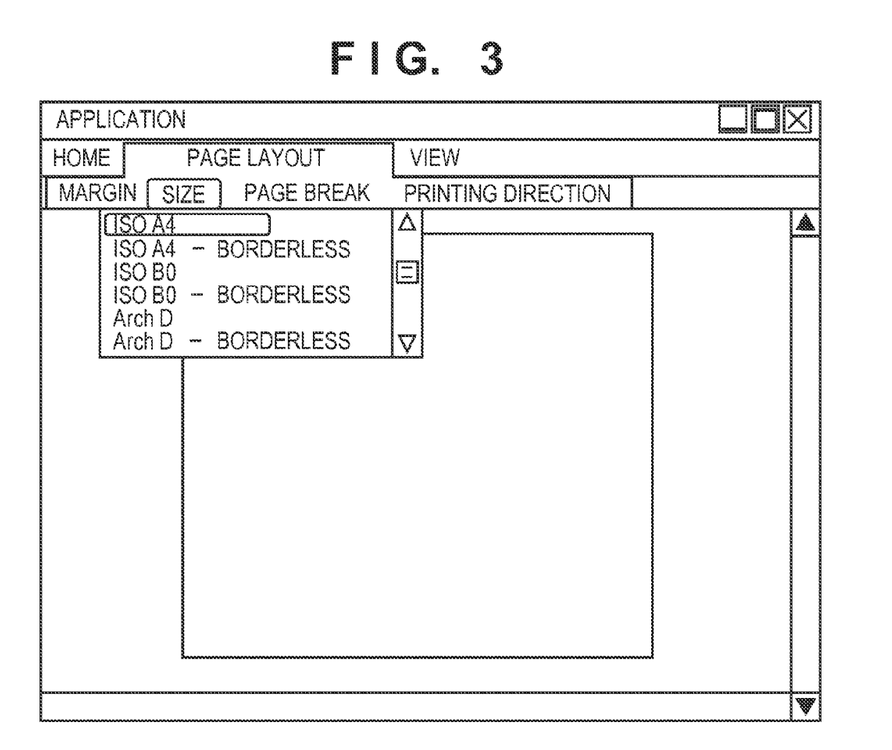
FIG. 3 is a view showing an example when a paper size is selected in an application.

FIG. 3 shows a typical example when a paper size is selected on the application 103 without opening a printer driver UI.

The user selects "size" from a "page layout" tab on the application 103. The application 103 requests, of the printer driver 104, the capability information of the printer 102 including a list of processible paper sizes. The printer driver 104 returns (provides) the capability information including the list (paper size list) of the paper sizes processible by the printer 102 itself, and the application 103 displays the paper size list included in the capability information on a screen. Note that at this time, the paper sizes included in the paper size list are displayed to the user as selection candidates of a paper size to be used for printing. The above cooperation allows the user to select a paper size on the application 103 without opening the printer driver UI.

Optimization of the paper size list by using the optimization control unit 105 according to this embodiment will be described below.

Figure 4:
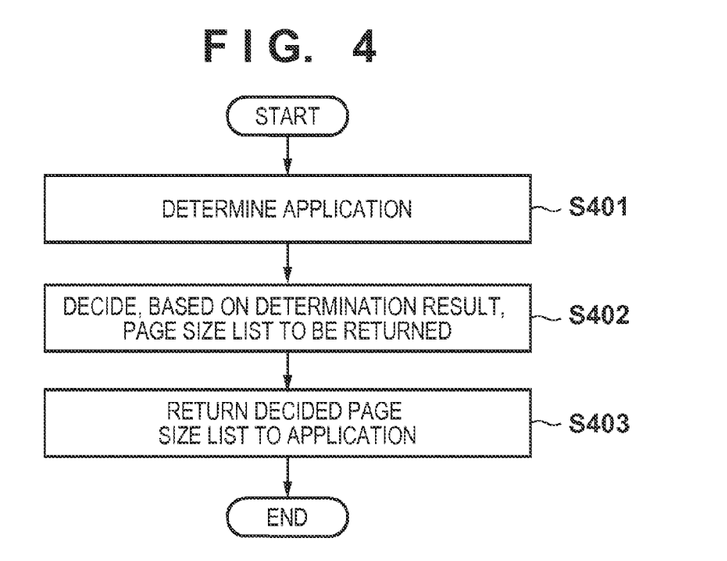
FIG. 4 is a flowchart illustrating the operation of an optimization control unit.

FIG. 4 is a flowchart illustrating paper size optimization processing executed by the optimization control unit 105 when the printer driver 104 receives a request of the capability information including the paper size list from the application 103.

Figure 6:
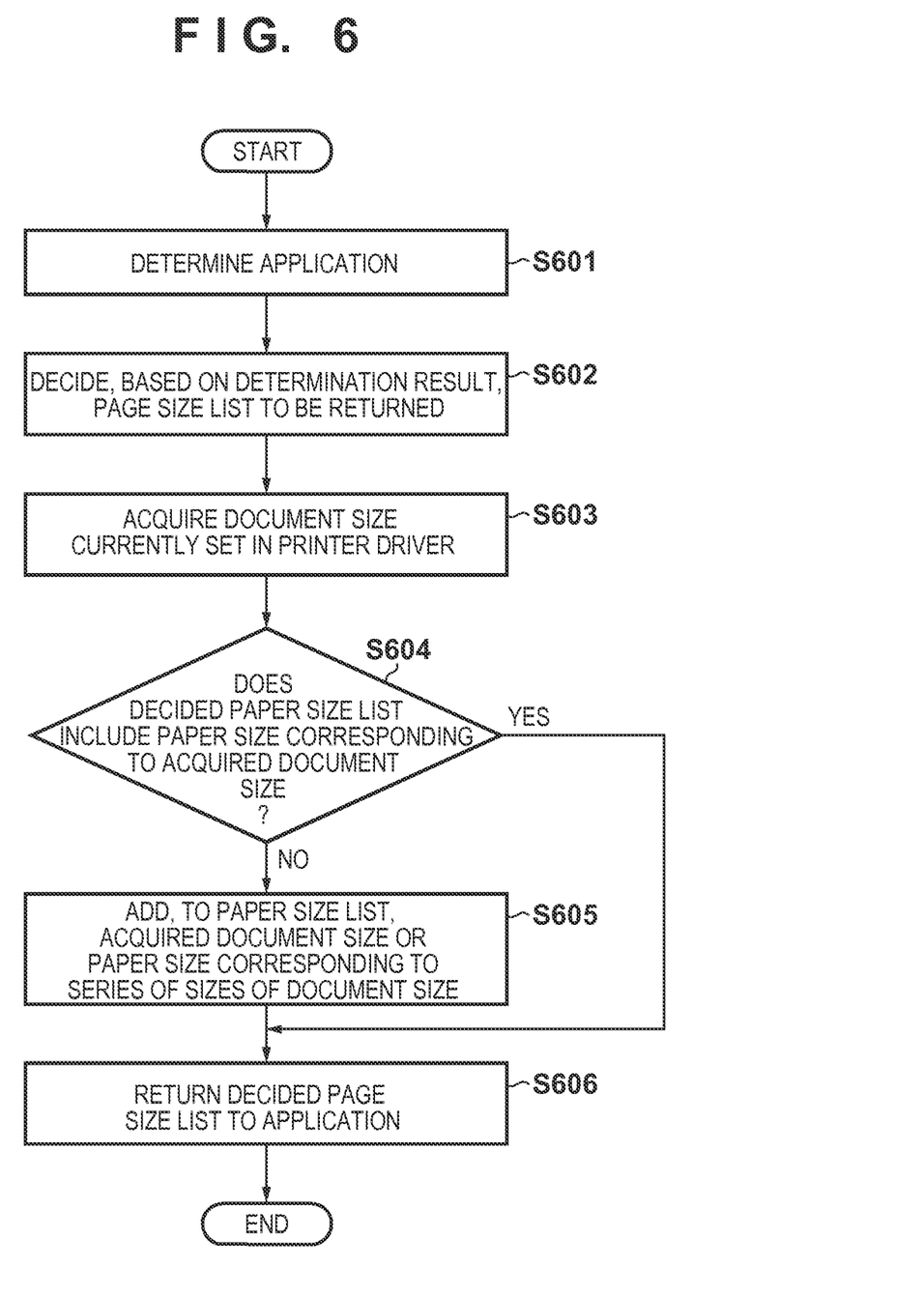
FIG. 6 is a flowchart illustrating the operation of the optimization control unit.
Figure 7:
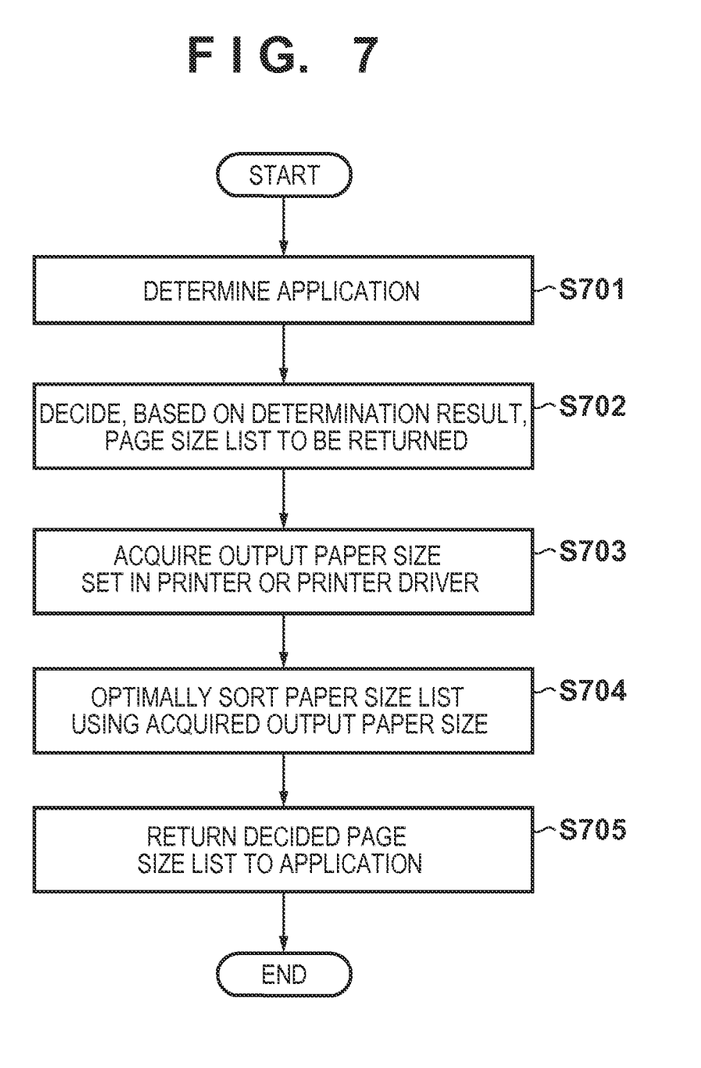
FIG. 7 is a flowchart illustrating the operation of the optimization control unit.

Note that programs corresponding to a flowchart shown in FIG. 4 and those shown in FIGS. 6 and 7 (to be described later) are stored in the storage apparatus 202 and a ROM (not shown). The processes of the flowcharts shown in FIGS. 4, 6, and 7 are implemented when the central processing apparatus 201 executes the programs on a RAM (not shown).

In step S401, the optimization control unit 105 determines the application 103 as a calling source (request source) of the capability information of the printer 102, which includes the paper size list processible by the printer driver 104.

In step S402, the optimization control unit 105 decides (generates) a paper size list optimum for the application 103 as a calling source based on a determination result in step S401 and the paper size list processible by the printer driver 104. As a decision method at this time, the optimization control unit 105 holds in advance a management table for managing a paper size list for each application 103. In this case, a paper size list corresponding to the application determined in step S401 is decided by referring to the management table.

For each application 103, the optimization control unit 105 holds only a paper size matching condition under which paper sizes matching the application are selected. A paper size list corresponding to the application determined in step S401 may be decided by filtering the paper size list processible by the printer driver 104 using the matching condition every time processing is performed.

A practical example of the paper size optimization processing executed by the optimization control unit 105 will now be described with reference to FIG. 5.

Figure 5:
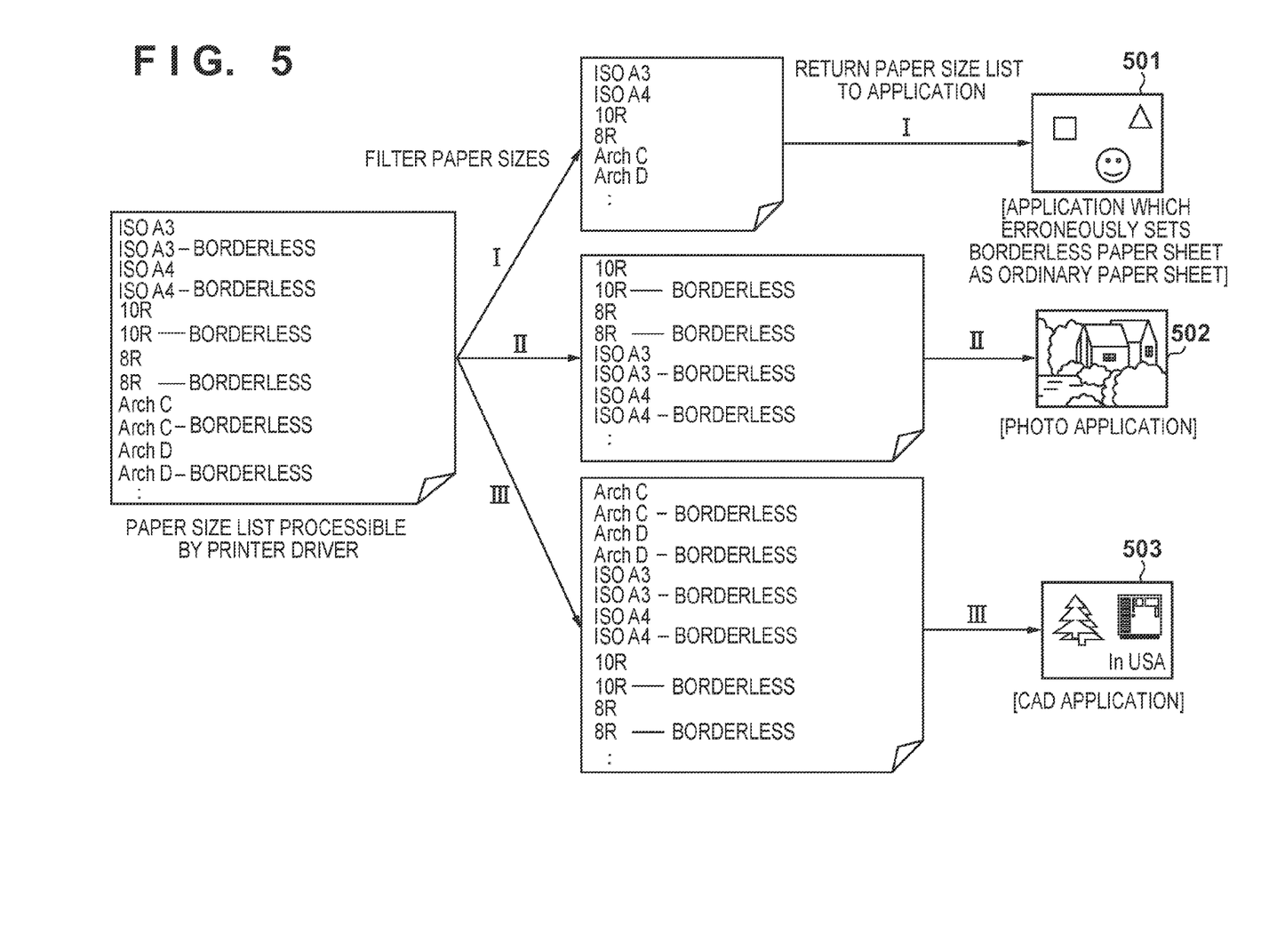
FIG. 5 is a view showing an example of optimization of paper sizes.

According to a path I shown in FIG. 5, a paper size list obtained by deleting borderless paper sizes from the paper size list processible by the printer driver 104 is returned (provided) to an application 501. Note that in this embodiment, the application 501 is an application which unwantedly sets a borderless paper size as an ordinary paper size, and the paper size list corresponding to the application 501 includes no borderless paper sizes. Since the borderless paper sizes are filtered out, the application 501 cannot recognize any borderless paper size from the beginning, thereby preventing the application 501 from erroneously executing A4 size printing at the borderless A4 size.

When the paper size list is displayed on the application 501, and the user selects a size from the displayed paper size list, the above-described filtering processing prevents the user from erroneously selecting a borderless paper size. Note that a list without any borderless paper size, as described above, need only be associated with an application (for example, a document application) inappropriate for borderless printing.

According to a path II shown in FIG. 5, with respect to the paper size list processible by the printer driver 104, photo paper sizes such as 10R (254×305 mm) often used by a photo application 502 are sorted to the beginning of the list. Paper sizes such as Arch sizes which are not generally used by the photo application are deleted from the paper size list. A paper size list generated by the above-described processing (optimization) is returned (provided) to the photo application 502. This allows the user to readily, preferentially select a photo paper size on the photo application 502. Furthermore, since no unnecessary paper sizes are displayed, it is possible to improve the operability of paper size selection.

According to a path III shown in FIG. 5, with respect to the paper size list processible by the printer driver 104, the Arch paper sizes generally used for architecture by a CAD application 503 are sorted to the beginning of the list. A paper size list generated by the above-described processing (optimization) is returned (provided) to the CAD application 503. This makes it possible to improve the operability of paper size selection.

Note that as shown in FIG. 5, in the paper size list corresponding to each application, the paper sizes corresponding to the application among the plurality of paper sizes processible by the printer driver are filtered. Furthermore, in each paper size list, the paper sizes are sorted in an order according to the priority levels of the paper sizes in the corresponding application. In the application, the paper sizes are displayed in that order so as to be selectable by the user. In the display screen provided by the application, therefore, the user can appropriately select a paper size having a high priority level in the application from the paper sizes corresponding to the application.

The description will revert to that of FIG. 4.

In step S403, the optimization control unit 105 returns (provides) the paper size list decided in step S402 to the application 103 as a request source, thereby terminating the process.

With the above processing, with respect to an application to be used, an appropriate paper size list corresponding to the application is displayed on the application 103. As a result, it is possible to prevent a specific application from erroneously selecting a paper size, and improve the user operability when selecting a paper size on the application 103.

FIG. 6 is a flowchart illustrating, as an application of the processing shown in FIG. 4, paper size optimization processing in consideration of a paper document size set in the printer driver 104.

Processes in steps S601 and S602 respectively correspond to those in steps S401 and S402 of FIG. 4 and a description thereof will be omitted.

In step S603, the optimization control unit 105 acquires a paper document size currently set in the printer driver 104.

In step S604, the optimization control unit 105 determines whether a paper size list decided in step S602 includes a paper size corresponding to the paper document size acquired in step S603. If the paper size list does not include the paper size (NO in step S604), the process advances to step S605; otherwise (YES in step S604), the process advances to step S606.

Note that the above-described "document size" is a size settable by the user in the printer driver UI, and is set, for example, by the user in accordance with a page size in an application. For example, a page size set in the application or that often set as a page size by the user is set as a document size in the printer driver UI. If it is determined in step S604 that the paper size list does not include the document size, it is probable that the list includes no paper size desired by the user, and thus a paper size is added in step S605.

In step S605, the optimization control unit 105 adds, to the paper size list, the paper document size acquired in step S603 or a paper size corresponding to the same series of sizes as that of the paper document size. For example, even if photo paper sizes have been excluded in advance for the CAD application for processing CAD data, when the paper document size of the printer driver 104 has been set to 8R (203× 254 mm), 8R or all the photo paper sizes are added to the paper size list.

In step S606, the optimization control unit 105 returns (provides) the paper size list decided in step S602 or S605 to the application 103 as a request source, thereby terminating the process.

With the above processing, in an application, even among paper sizes which have been excluded in advance from the paper size list because their use frequencies are low, a paper size set as the document size of the printer driver 104 is added to the paper size list. Therefore, even among paper sizes excluded in advance, a paper size designated as a document size by the user in the driver UI can be designated from the application, and can thus be used.

FIG. 7 is a flowchart illustrating, as an application of the processing shown in FIG. 4, paper size optimization processing in consideration of the output paper size of a paper feed unit (paper tray) attached to the printer 102 or an output paper size set in the printer driver 104.

Processes in steps S701 and S702 respectively correspond to those in steps S401 and S402 of FIG. 4 and a description thereof will be omitted.

In step S703, the optimization control unit 105 acquires the output paper size of the paper feed unit attached to the printer 102 or an output paper size currently set in the printer driver 104.

In step S704, the optimization control unit 105 sorts paper sizes falling within the range of the output paper size acquired in step S703 to the beginning of a paper size list decided in step S702. If, for example, the output paper size is an A2 size, the optimization control unit 105 sorts data such as A4 and 10R equal to or smaller than the A2 size to the beginning of the list, and data such as A1 and Arch D equal to or larger than the A2 size to the end of the list.

In step S705, the optimization control unit 105 returns (provides) the paper size list decided in step S704 to the application 103 as a request source, thereby terminating the process.

With the above processing, since paper sizes actually printable by the printer 102 are preferentially sorted to the beginning of the paper size list, it becomes difficult for the user to select a paper size which causes print data to extend outside a printing sheet. It can thus be expected to reduce printing errors and improve the operability of paper size selection.

Figure 8:
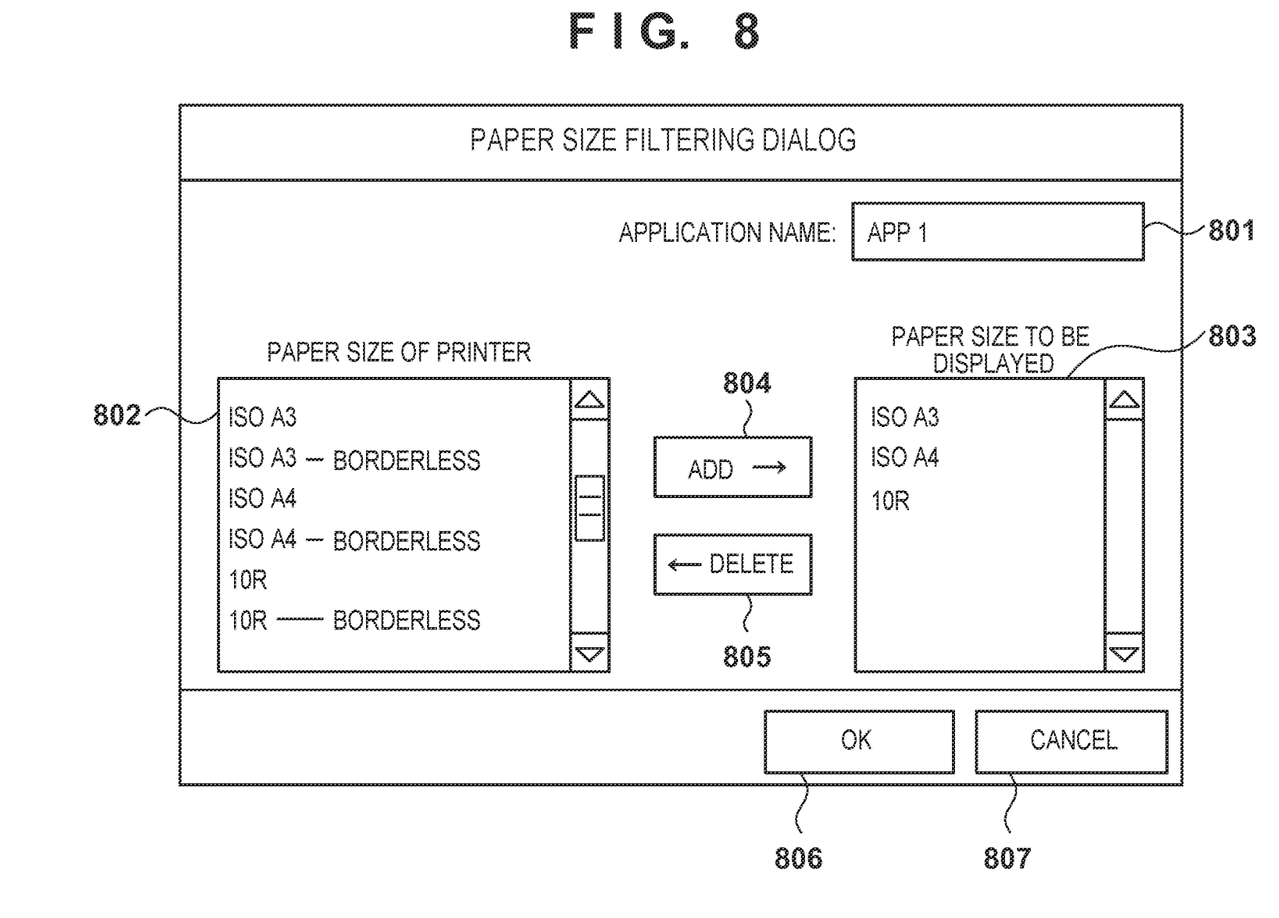
FIG. 8 is a view showing a paper size filtering dialog.

FIG. 8 is a view showing an example of a dialog used when the user operates (sets) filtering (optimization) of paper sizes to be displayed for each application.

Referring to FIG. 8, reference numeral 801 denotes an application name input combo box; 802, a printer paper size display portion; 803, an application paper size display portion; 804, an add button; 805, a delete button; 806, an OK button; and 807, a cancel button.

The user uses the application name input combo box 801 to input an application name for which filtering of paper sizes is actually performed. The user then selects a paper size to be displayed in the paper size list of the application from a list of all paper sizes processible by the printer, which is displayed in the printer paper size display portion 802, and presses the add button 804. As a result, the selected paper size is added to the application paper size display portion 803.

On the other hand, if the user wants to delete a selected paper size, he/she presses the delete button 805. When the user presses the OK button 806 after selecting all paper sizes to be displayed on the application, a paper size filtering function is enabled in the application designated by the application name input combo box 801. If the user presses the cancel button 807 at this time, settings changed so far are disabled, thereby closing the dialog.

The filtering function implemented by this dialog can be implemented as part of the function of the optimization control unit 105, or as another module. Various settings for the paper sizes forming the paper size list decided by the filtering function are registered as setting values in the application 103.

The aforementioned processing makes it possible to perform fine control of a paper size list according to the environment of the user, and the intended application and purpose.

As described above, according to this embodiment, a printer driver returns (provides), to an application, only paper sizes appropriate for the application as capability information. This can prevent erroneous selection of a paper size, which is unique to the application. According to this embodiment, a paper size list is filtered to include paper sizes appropriate for an application. In addition to this, the paper sizes of the list are sorted in an order corresponding to the application. If, therefore, the paper sizes are displayed in the order of the list on the application, the user can readily select a paper size having a high priority level, thereby improving the user operability.

A case has been explained in which information (for example, sizes processible by the printer driver) in the printer driver is returned to an application as the capability information of the printer which has been requested by the application. The present invention, however, is not limited to this. For example, the printer driver or another printer management tool may be used to acquire capability information such as printable paper sizes from the printer. The information may be used as the capability information of the printer.

As the capability information of the printer, in addition to the paper sizes, a printing method (double-sided printing, N-up printing, and the like) is acquired. Based on the acquired information and application, the printing method may be provided to the application.

In the aforementioned embodiment, a printing sheet has been exemplified as a printing medium (recording medium) on which a printing apparatus prints an image. The present invention, however, is not limited to this, and an OHP sheet may be used. In addition to a rectangular printing medium such as a printing sheet, a disk-shaped recording medium such as a CD or DVD may be used.

Note that in the aforementioned embodiment, a case in which a paper size list having undergone predetermined filtering for each application is returned to the application has been described. The present invention, however, is not limited to this, and filtering processing may be performed under various conditions. For example, the central processing apparatus 201 stores, in the storage apparatus 202, the history of paper sizes selected by the user in each application. A paper size whose selection count is larger may be arranged at an upper position of the paper size list. On the other hand, even if a paper size is included in the paper size list by predetermined filtering processing, when the use count of the paper size is small, the paper size may be deleted from the paper size list. In this case, in the display screen shown in FIG. 8, the user may be able to add, to the paper size list, even the paper size deleted from the paper size list.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-154957, filed Jul. 25, 2013, which is hereby incorporated by reference herein in its entirety.

What is claimed is:

1. An information processing apparatus comprising:
   a processor, and
   at least one memory configured to store a printer driver which causes a printer to print an image and a plurality of applications which request printing to the printer driver,
   wherein the printer driver handles a predetermined set of a plurality of sizes of a recording medium, which is used to specify a set of sizes of recording medium commonly for a first application and a second application among the plurality of applications,
   wherein the processor determines, by executing the printer driver stored in the at least one memory, an application which requests capability information of the printer driver, from the plurality of applications, and
   wherein, in a first case where the processor determines the first application as the application which requests the capability information, the processor specifies, by executing the printer driver, a first set of one or more candidate sizes of a recording medium to be used for printing by the printer as the capability information, from the predetermined set, and
   wherein, in a second case where the processor determines the second application as the application which requests the capability information, the processor specifies, by executing the printer driver, a second set of one or more candidate sizes different from the first set, from the predetermined set, and
   wherein the processor, by executing the determined application, causes a CRT or LCD to display information indicating the one or more candidate sizes of the specified first set, in the first case, and the processor, by executing the determined application, causes the CRT or LCD to display information indicating the one or more candidate sizes of the specified second set, in the second case.

2. The apparatus according to claim 1, wherein
the processor provides, in the first case, the one or more candidate sizes of the first set to the first application, by executing the printer driver, and causes the CRT or LCD to display the information by executing the first application, and
the processor provides, in the second case, the one or more candidate sizes of the second set to the second application, by executing the printer driver, and causes the CRT or LCD to display the information by executing the second application.

3. The apparatus according to claim 1, wherein
the processor, by executing the first or the second application, causes the CRT or LCD to display a size list indicating the one or more candidate sizes of the first set or the second set.

4. The apparatus according to claim 3, wherein
the processor specifies, by executing the printer driver, the one or more candidate sizes of the first set or the second set and an order of the one or more candidate sizes, in accordance with the determined application of the first application and the second application, and the processor causes, by executing the determined application, the CRT or LCD to display a size list in which the one or more specified candidate sizes are arranged in the specified order.

5. The apparatus according to claim 4, wherein
the recording medium is a paper sheet,
the processor acquires an output paper size for the printer, and
based on the output paper size, the processor determines the order, so that paper sizes falling within a range of the output paper size are arranged at the beginning of the size list.

6. The apparatus according to claim 1,
wherein the predetermined set includes a first predetermined size and a second predetermined size corresponding to the first predetermined size and borderless printing, and
wherein the second set includes the first predetermined size and the second predetermined size, and the first set includes the first predetermined size and does not include the second predetermined size.

7. The apparatus according to claim 1,
wherein the at least one memory stores, for each of the plurality of applications, a condition under which a size corresponding to each of the plurality of applications is selected from the predetermined set, and wherein the processor specifies the first set or the second set by selecting a size matching the application from the predetermined set with reference to the condition stored in the at least one memory.

8. The apparatus according to claim 1,
wherein the processor acquires a document size set in the printer driver, and
wherein if the specified first set or the specified second set includes no size corresponding to the document size, the processor adds the document size or a size of the same series of sizes as that of the document size to the first set or the second set, as a display target by the application.

9. The apparatus according to claim 1, wherein
the first set includes a common size included in the second set and includes a different size which is not included in the second set.

10. The apparatus according to claim 1,
wherein the processor sets, in response to a user instruction, a size among the one or more candidate sizes of the first set displayed on the CRT or LCD by the first application, in the first case, and
wherein the processor sets, in response to a user instruction, a size among the one or more candidate sizes of the second set displayed on the CRT or LCD by the second application, in the second case.

11. An information processing method comprising:
determining, by executing a printer driver which causes a printer to print an image, an application which requests capability information of the printer driver, from a plurality of applications which request printing to the printer driver,
wherein the printer driver handles a predetermined set of a plurality of sizes of a recording medium, which is used to specify a set of sizes of recording medium commonly for a first application and a second application among the plurality of applications,
in a first case where it is determined that the first application is the application which requests the capability information, specifying, by executing the printer driver, a first set of one or more candidate sizes of a recording medium to be used for printing by the printer as the capability information, from the predetermined set, and
in a second case where it is determined that the second application is the application which requests the capability information, specifying, by executing the printer driver, a second set of one or more candidate sizes different from the first set, from the predetermined set, and
causing, by executing the determined application, a CRT or LCD to display information indicating the one or more candidate sizes of the specified first set, in the first case, and causing, by executing the determined application, the CRT or LCD to display information indicating the one or more candidate sizes of the specified second set, in the second case.

12. A non-transitory computer-readable storage medium storing a printer driver which causes a printer to print an image and causes a computer to control an information processing apparatus, the printer driver causing the computer to function as
a determining unit configured to determine an application which requests capability information of the printer driver, from a plurality of applications which request printing to the printer driver;
wherein the printer driver handles a predetermined set of a plurality of sizes of a recording medium, which is used to specify a set of sizes of recording medium commonly for a first application and a second application among the plurality of applications,
a specifying unit configured to specify, in a first case where it is determined that the first application is the application which requests the capability information, one or more candidate sizes of a recording medium to be used for printing by the printer as the capability information, from the predetermined set, and
configured to specify, in a second case where it is determined that the second application is the application which requests the capability information, a second set of one or more candidate sizes different from the first set, from the predetermined set, and
a providing unit configured to provide the one or more candidate sizes to the determined application so that information indicating the one or more candidate sizes of the specified first set, in the first case, are displayed on a CRT or LCD, and so that information indicating the one or more candidate sizes of the specified second set, in the second case, are displayed on the CRT or LCD.

13. The storage medium according to claim 12, wherein
in the first case, the one or more candidate sizes of the first set is provided to the first application, by the printer driver, and the CRT or LCD is caused to display the information by the first application, and
in the second case, the one or more candidate sizes of the second set is provided to the second application, by the printer driver, and the CRT or LCD is caused to display the information by the second application.

14. The storage medium according to claim 12, wherein
by the first or the second application, the CRT or LCD is caused to display a size list indicating the one or more candidate sizes of the first set or the second set.

15. The storage medium according to claim 14, wherein
by executing the printer driver, the one or more candidate sizes of the first set or the second set and an order of the one or more candidate sizes is specified, in accordance with the determined application of the first application and the second application, and, by executing the determined application, the CRT or LCD is caused to display a size list in which the one or more specified candidate sizes are arranged in the specified order.

16. The storage medium according to claim 15, wherein
the recording medium is a paper sheet,
an output paper size for the printer is acquired, and
based on the output paper size, the order is determined, so that paper sizes falling within a range of the output paper size are arranged at the beginning of the size list.

17. The storage medium according to claim 12,
wherein the predetermined set includes a first predetermined size and a second predetermined size corresponding to the first predetermined size and borderless printing, and
wherein the second set includes the first predetermined size and the second predetermined size, and the first set includes the first predetermined size and does not include the second predetermined size.

18. The storage medium according to claim 12, wherein,
for each of the plurality of applications, a condition under which a size corresponding to each of the plurality of applications is selected from the predetermined set, is stored in the storage medium,
and wherein the first set or the second set is specified by selecting a size matching the application from the predetermined set with reference to the condition stored in the at least one memory.

19. The storage medium according to claim 12,
wherein a document size set in the printer driver is acquired, and
wherein if the specified first set or the specified second set includes no size corresponding to the document size, the document size or a size of the same series of sizes as that of the document size is added to the one or more the first set of the second set, as a display target by the application.

20. The storage medium according to claim 12, wherein the first set includes a common size included in the second set, and includes a different size which is not included in the second set.

21. The storage medium according to claim 12, wherein, in response to a user instruction, a size among the one or more candidate sizes of the first set displayed on the CRT or LCD by the first application, is set in the first case, and
wherein, in response to a user instruction, a size among the one or more candidate sizes of the second set displayed on the CRT or LCD by the second application, is set in the second case.

\* \* \* \* \*